350-266.   SR 10-12-71   OR   3,612,665

United States Patent

[11] 3,612,665

| [72] | Inventor | Eustathios Vassiliou<br>Wilmington, Del. |
|---|---|---|
| [21] | Appl. No. | 823,461 |
| [22] | Filed | May 9, 1969 |
| [45] | Patented | Oct. 12, 1971 |
| [73] | Assignee | E. I. du Pont de Nemours and Company<br>Wilmington, Del. |

[54] METHOD AND APPARATUS FOR FORMING A VISUAL IMAGE OF A LATENT MAGNETIC IMAGE
18 Claims, 7 Drawing Figs.

[52] U.S. Cl. .................................................. 350/266,
178/7.3 D, 178/7.5 D, 179/100.2 B, 324/43 L
[51] Int. Cl. ...................................................... G01r 33/02,
G02f 1/30, G11b 11/10
[50] Field of Search ............................................ 346/74 MP;
179/100.2 B, 100.2 E; 178/7.3 D, 7.5 D; 324/43 L;
350/266, 267

[56] References Cited
UNITED STATES PATENTS

| 1,963,496 | 6/1934 | Land .............................. | 324/43 L |
| 2,884,348 | 4/1959 | Kulesza ......................... | 346/74 MP |
| 2,890,288 | 6/1959 | Newman ....................... | 179/100.2 E |
| 3,109,062 | 10/1963 | Clauer ........................... | 178/7.5 D |
| 3,181,059 | 4/1965 | Mohnkern ..................... | 179/100.2 B |
| 3,239,753 | 3/1966 | Arnold .......................... | 350/266 |
| 3,322,482 | 5/1967 | Harmon ........................ | 178/7.3 D |

*Primary Examiner*—Bernard Konick
*Assistant Examiner*—Howard W. Britton
*Attorney*—Herbert M. Wolfson ABSTRACT: An apparatus and method for the visual observation of a latent magnetic image recorded on a magnetic member. The apparatus comprises: a nonmagnetic vessel, positioned above the magnetic member, having a broad shallow cavity containing magnetically active particles in a fluid or a vacuum; and a magnet to produce an external magnetic field. The magnetically active particles collect on the latent magnetic image to produce a visual image. If the external magnetic field is constant, the resolution of the visual image is increased. If the magnetic field is cycled between alternating polarity and is of sufficient intensity, the image reverses and the speed with which the visual image can follow changes in the latent magnetic image is increased.

3,612,665

PATENTED OCT 12 1971　　SHEET 1 OF 2

INVENTOR
EUSTATHIOS VASSILIOU

BY
ATTORNEY

METHOD AND APPARATUS FOR FORMING A VISUAL IMAGE OF A LATENT MAGNETIC IMAGE

BACKGROUND OF THE INVENTION

This invention relates to a method and apparatus for producing visual images of information recorded as latent magnetic images on a magnetic member. More particularly it relates to a method and apparatus for producing visual images of rapidly changing information either recorded as stationary latent magnetic images on a moving magnetic member or as changing latent magnetic images on a stationary magnetic member.

Magnetic readers, used for viewing the latent magnetic images recorded on a magnetic member, are well known to those skilled in the art. Normally, they consist of a vessel having a broad shallow cavity with a transparent cover containing a quantity of magnetically active material in a fluid. The magnetic reader is placed over the magnetic member and the magnetically active particles decorate the latent magnetic image, forming a visual image of the information. Actually, as will be discussed below, only certain types of latent images, those formed from active magnetic interfaces, can be viewed in this manner. One such magnetic viewer is described in U.S. Pat. No. 3,013,206, R. J. Youngquist.

The resolution of this type of magnetic reader is poor. The visual image can be seen, but it is not suitable for projection. Even if it were suitable for projection, the decoration process is slow to respond to changes in the latent magnetic images so that if the latent image is changing or the magnetic member is moving, the magnetic reader will not produce a readable visual image.

The use of an external DC magnetic field will enhance the field due to the latent magnetic image and will increase the resolution of the visual image produced by such magnetic readers. The use of an external DC magnetic field in conjunction with a magnetic reader, has been disclosed in U.S. Pat. No. 3,181,059, G. L. Mohnkern, but this disclosure was directed at the specialized purpose of bucking out portions of a magnetic dipole field so that the orientation of the dipole could be determined. It was not realized that the use of such DC external magnetic field would generally increase the resolution of magnetic readers.

The prior art is, therefore, limited to magnetic recorders with ill-formed visual images due to the absence of an enhancing field, or magnetic recorders in which an external DC bucking field is used to identify certain features of the magnetic information, but not to increase the resolution of the visual image. In all cases, the prior art is limited to use with stationary or at very best slowly varying latent magnetic images, because even with a DC enhancing field there is a complete loss of visual representation when the latent magnetic image changes rapidly.

Magnetic recording systems are now being used in a great variety of forms to record and store information. Most recently this information is being stored in the form of pictorial representations. There is a need for a method to recover this information and to project it in a useful form. A magnetic recording system, such as the one described above, would be useful in this context if the twin problems of resolution and the slow response time of the system could be solved.

Accordingly it is an object of the present invention to provide a magnetic reader capable of producing well resolved visual images of information stored in the form of latent magnetic images on a magnetic member.

It is a further object of the present invention to provide a magnetic reader capable of producing a visual image of information stored in the form of latent magnetic images on a magnetic member which is in a form suitable for projection.

It is a still further object of the present invention to provide a magnetic reader capable of producing well resolved visual images in response to rapidly changing latent magnetic images due to either a moving magnetic member containing permanent information or to a stationary magnetic member upon which the information content is changing.

SUMMARY OF THE INVENTION

These objects of the present invention are achieved by the use of a magnetic reader in the form of a nonmagnetic vessel having a broad shallow cavity containing magnetically active particles in a fluid or a vacuum. The vessel is positioned over the magnetic member containing the latent magnetic image, so that the magnetically active particles will decorate the latent magnetic image, forming a visual image of it. An external magnetic field is provided to enhance the magnetic field of the latent magnetic image. If the magnetic field is a constant magnetic field, it merely increases the resolution of the visual image formed by the magnetic reader. If the magnetic field is an alternating magnetic field of sufficient strength, however, both the resolution of the visual image and the speed with which the system responds to changes in the latent magnetic image are improved. The use of an alternating polarity field tends to increase the resolution because all of the active interfaces, not just the properly oriented ones, are decorated. To increase the response speed, however, the magnetic field must be an alternating polarity magnetic field with a maximum field strength at least sufficient to cause the magnetically active particles to decorate the nonmagnetized areas of the magnetic member as well as various portions of the magnetized area, but not sufficient to cause the magnetically active particles to coat the entire surface of the magnetic member. Since the magnetically active particles normally collect only over magnetized portions of the magnetic member, the use of the alternating polarity magnetic field causes what appears to be a reversal of the visual image. Besides causing this reversal, use of the alternating magnetic field, within the critical region of field strength discussed above, primes the system so that it is responsive to rapid changes in the latent magnetic image. The operation and advantages of the present invention can best be described with reference to the following FIGS. in which:

DETAILED DESCRIPTION OF THE FIGURES

It has long been known that visual images of latent magnetic images recorded on a magnetic member can be formed by decorating the latent magnetic images with magnetically active particles. These particles can be thought of as being dispersed in a fluid, but for the present we will assume that the dispersion is a powder of the magnetically active particles in a gaseous atmosphere, such as air. In the decoration process, the powder concentrates where the magnetic flux lines leave the magnetic or physical discontinuities and enter the space where the magnetic particles are located. In most cases this occurs at the interface between a magnetized and nonmagnetized region of the magnetic member, or between two adjacent magnetized regions of opposing polarity. As it turns out, however, not all such interfaces will be decorated with the powder. The distinguishing feature between those interfaces which will be decorated by the magnetically active particles and those interfaces which will not, seems to be whether or not the magnetic lines of force which define the interface form loops which intersect the interface. If the loops intersect the interface, magnetically active particles will collect on the interface. If the loops do not intersect the interface, the magnetically active particles will not decorate the interface. We will use the term "active magnetic interface" to describe those interfaces which the magnetically active powder will decorate, and the term "passive magnetic interface" to describe those interfaces which will not be decorated by the magnetically active powder. The method of the present invention is effective in forming visual images of only those latent magnetic images which are formed from a series of active magnetic interfaces.

Figure 1:
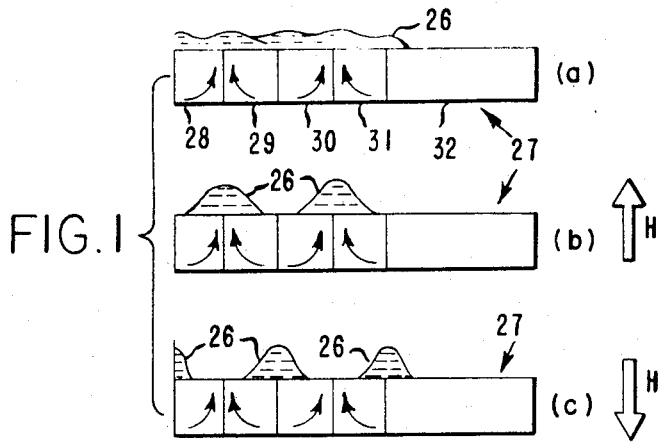
FIG. 1 is a schematic diagram illustrating the effect of a constant external magnetic field on the decoration of an active magnetic interface.

In FIG. 1 a magnetically active powder 26 has been placed on the magnetic member 27. The magnetic member has four magnetized regions 28, 29, 30 and 31, and a nonmagnetized region 32, all with magnetically active interfaces. In FIG. 1a there is no external field. The powder has been initially vibrated so that it is free to be drawn into the magnetized region, and within that region it exhibits a tendency to collect over the magnetically active interfaces. If the magnetic field in the member were strong enough, the powder would collect in discrete piles over the magnetically active interfaces, but normally the field is not strong enough so the powder merely mounds at the interface and does not form discrete piles. In those cases where the field is strong enough to form discrete piles, the piles are very diffuse so that the visual image formed by the distribution of powder is not well resolved. Such images are not suitable for reproduction or projection.

In FIG. 1b an external magnetic field H is applied perpendicular to the surface of the member. The field in the region of the interface is enhanced by the external magnetic field, and the powder forms into discrete piles along certain of the active magnetic interfaces. The resolution of the image generally increases as a function of the strength of the external magnetic field, and such a visual image is generally good enough to be reproduced by any technique known to those skilled in the art. One such technique would be by reflecting light off the surface onto a screen; another would be to project light through the magnetic member, providing the member is transparent.

In FIG. 1b the external magnetic field H is oriented in one direction. In FIG. 1c the direction of the field has been reversed. In each case the powder collects over that active magnetic interface at which the magnetic field of the interface is enhanced by the applied external magnetic field. This is due to the fact that the external magnetic field lines are channeled through the interfaces at which the field lines are properly oriented. There is no difference, as far as the resolution is concerned, which orientation is used.

In the situation described above, the external magnetic field is a constant magnetic field. The magnetically active material can be in the form of powder as discussed above or a suspension of magnetically active particles in a liquid vehicle. In fact, a liquid suspension is preferred. Since a rapid change in the latent magnetic image recorded on the magnetic member is not contemplated, the magnetically active material can be almost any magnetically active material. Even weekly magnetic materials such as $Fe_2O_3$ in a liquid vehicle will work. The liquid can be almost any liquid such as water, mineral oil or organic solvents which will not react with the magnetically active material.

Figure 2:
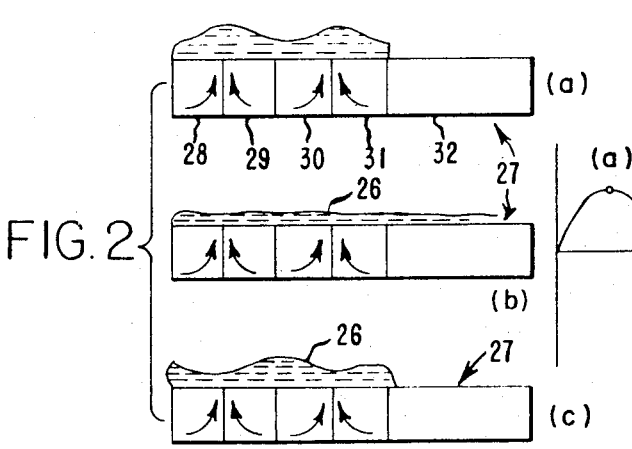
FIG. 2 is a schematic diagram illustrating the effect of a low field alternating polarity external magnetic field on the decoration of an active magnetic interface.

The speed with which the visual image discussed above can vary with changes in the latent magnetic image is limited. Normally it takes about a second for the suspension to reorient itself if the latent magnetic image changes. This situation can be remedied if an alternating polarity magnetic field rather than a constant magnetic field is applied. FIG. 2 shows an arrangement similar to that of FIG. 1 in all respects except in this case a weak, alternating polarity, magnetic field is applied. In FIG. 2a the external magnetic field is at a maximum and oriented in one direction; in FIG. 2b the external magnetic field is zero; and in FIG. 2c the external magnetic field is at a maximum and oriented in a direction opposite to that shown in FIG. 2a. It must be emphasized, that even at its maximum this is a weak external magnetic field. In FIG. 2a the field is in a direction such that the powder collects over the interfaces between regions 28 and 29 and between regions 30 and 31. As shown, the total magnetic field is strong enough to cause all the magnetic material to be drawn into the magnetized region but not strong enough to resolve the peaks over the interfaces. It is possible that the field could be increased to provide resolution of the peaks without altering the situation to that shown in FIG. 3, but for convenience we will assume that the field is too weak to do this. Whether or not the peaks are resolved does not alter the discussion. In FIG. 2b the field has reached a zero level in the cycle and the powder reorients itself over the entire magnetized area. Again, if the field due to the magnetic signal itself is large enough, some peaks and valleys may appear, but the resolution of the peaks would certainly be worse than the resolution of the peaks formed in the case of the constant magnetic field. In FIG. 2c the magnetic field has increased to a maximum again, but this time the peaks are formed over the other interfaces because the magnetic field is oriented in a direction opposite to its direction in FIG. 2a. The image produced in the low field alternating polarity case is similar to that produced in the constant magnetic field case of FIG. 1 except that the resolution is usually poorer. It must be remembered, however, that to get the distribution shown in FIG. 1a the magnetic member had to be vibrated initially. This was to "unstick" the particles from their position on the nonmagnetized area of the magnetic member so that the small fields exerted by the latent magnetic image were sufficient to draw the magnetically active particles into the magnetized area. In the case of an alternating magnetic field, however, the fact that the particles are subjected to the alternating magnetic field means that the particles are automatically unstuck from their position over the nonmagnetized area so that no initial vibration is needed.

The alternating magnetic field imparts enough activity to the magnetically active particles so that in effect a suspension of the magnetically active particles is formed, so that the negatively active particles are easily moved by the magnetic field. In the situation illustrated by FIG. 2, this activity is sufficient to allow the particles to be drawn into the magnetized region by the applied fields. As the amplitude of the alternating component increases, the activity of the particles increases until at some point the situation of FIG. 3 occurs.

Figure 3:
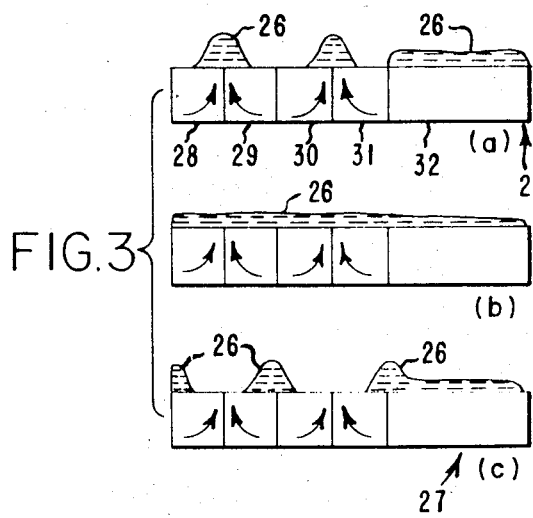
FIG. 3 is a schematic diagram illustrating the effect of a high field alternating polarity external magnetic field on the decoration of the entire magnetic member.

Before discussing the phenomenon illustrated by FIG. 3, we must note that so long as the alternating component of the magnetic field is present, the actual magnitude of the magnetic field is not critical. A constant component could be added to the varying component shown in FIG. 2 and the result would be much the same; in fact the resolution would probably be increased.

In FIG. 3 the magnetic member 27 and the information contained on it are the same as in the preceding two FIGS. An alternating polarity magnetic field is also used, but this time the strength of the magnetic field is above a certain level, normally below the coercivity of the magnetic member, at which a complete image reversal occurs. At first it appears that all of the powder is collected over the nonmagnetized area of the magnetic member, but a closer look reveals that very sharply resolved peaks of powder also appear at the active magnetic interfaces. In FIG. 3a the field is at a maximum and is oriented in one direction. The nonmagnetized region and the interfaces between regions 28 and 29 and between 30 and 31 are covered. In FIG. 3b the field is zero and the whole surface is covered. In FIG. 3c the field is reversed in direction and is again a maximum. The nonmagnetized region and the other interfaces are covered.

Figure 4:
FIG. 4 illustrates the visual image formed using a low field alternating polarity external magnetic field.
Figure 5:
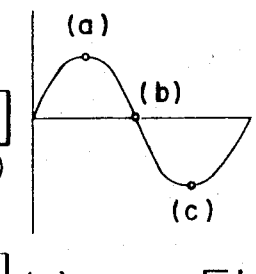
FIG. 5 illustrates the visual images formed using a high field alternating polarity external magnetic field.
Figure 5:
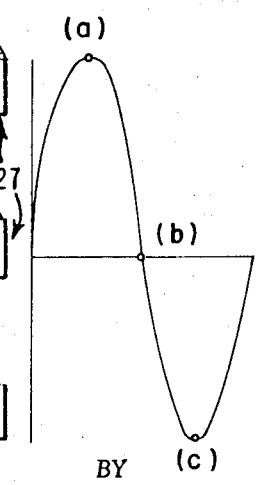

There are two aspects to the phenomenon. The first is an image reversal. In the situations illustrated in FIGS. 1 and 2 above, the powder was all collected over the magnetized area. Sometimes it completely covered the magnetized area, sometimes it was resolved into discrete regions of the magnetized area, but by contrast with the nonmagnetized area, the magnetized area assumed the color of the powder; whether it be dark or light. In the situation illustrated in FIG. 3, the nonmagnetized area is always covered with powder and the magnetized area is either totally or partially covered by the powder, depending on the position in the cycle. By contrast, then, the nonmagnetized area of the member assumes the color of the powder. The net result is what appears to be an image reversal over the constant or low field alternating polarity situation. This distinction is illustrated by FIGS. 4 and 5 in which a magnetic member has been totally magnetized in lines of opposing polarity, and an area 35 in the shape of the FIG. 2 has been demagnetized. FIG. 4 shows the low field situation. Assuming the powder is black, the nonmagnetized area appears white because powder is excluded from it. FIG. 5 illustrates the high field alternating polarity magnetic field situation. FIG. 5a illustrates the situation where there is a maximum field oriented in one direction Powder collects on the demagnetized area of the FIG. 2 35 and on the interfaces 36 illustrated by dark lines. The dotted lines 37 are the uncovered magnetic interfaces. FIG. 5b illustrates the zero field situation where the whole member is covered, and FIG. 5 c illustrates the maximum reverse field situation where again the FIG. 2 35 is covered with the powder, along with the solid lines 36 which represent the interfaces which were dotted lines in FIG. 5a. Here again, the dotted lines 37 of FIG. 5c represent the uncovered interfaces.

The second aspect of the phenomenon is less dramatic, but of greater consequence. For reasons, not fully understood, the time required for the visual image to change in response to changes in the latent magnetic image is decreased from seconds to at least milliseconds. This means that the visual image formed by the powder can follow rapid changes in the latent magnetic image which increases the usefulness of the system.

The reason for the image reversal is believed to be the activity imparted to the magnetically active powder by the magnetic field. It is believed that the normal tendency of this high field cycling between alternating polarities is to scatter the powder into a uniform distribution over the entire surface, and that it is only in those regions near a large magnetic gradient where the powder is distorted from that uniform distribution. The field at the interface is great enough to overcome the scattering force and draw the powder away from adjacent region, i.e. those regions within the magnetized area but not over an interface; but it is not strong enough to draw powder from regions which are further away, i.e. the nonmagnetized region. This theory is backed up by the fact that if the strength of the magnetic field is increased even further, the entire surface will be essentially covered at all times and the visual image is lost. The scattering force becomes too great to be overcome by the localized fields at the interfaces. It appears, then, that there is a critical range of magnetic field strength in which this phenomenon occurs, but it is difficult to set generalized limits on the range of this region because the thresholds will vary with the type of magnetic material used and can only be determined empirically in each situation.

In the case of a constant external magnetic field, used merely to increase the resolution of the visual image, almost any type of magnetically active material dispersed in almost any fluid can be used. In the high strength alternating field case, the requirements are more critical. To date, only powders of magnetically active material have been used successfully, and it is believed that powders will remain the optimum form of suspension. The powder can be in a gaseous atmosphere or in a vacuum. It is conceivable, however, that a liquid suspension with a low viscosity could be used successfully. This is even more feasible in the situation where the frequency of the external magnetic field cycle is low and when the rate at which the latent magnetic images changes is slow.

It has also been found that not all magnetically active materials work well in this high speed configuration. Once again, the distinction is relative. When the magnetically active particles are not required to follow rapid changes in in magnetic field or in the latent magnetic image, then almost any magnetic material will work, but from the point of view of a system which will respond to millisecond changes in latent magnetic images and to a 60c.p.s. alternating magnetic field, the situation is more critical. It is the high speed situation that we will now concentrate on, but once again it must be emphasized that the relative effectiveness of the various materials will change as the circumstances change, and that almost any magnetically active material will work under some circumstances.

In the high speed case, weakly magnetic particles such as $\alpha$ $Fe_2O_3$ will not work. This is understandable because the magnetic properties of these materials are such that the force exerted by the changing magnetic field is not strong enough to overcome the inertia and friction of the particles. Magnetic materials such as cobalt, barium ferrite, nickel, carbonyl iron and magnetic $Fe_2O_3$ will work, but not particularly well. It appears that the better the magnetic properties of the material, the better the material operates in the system. This is true only up to a point, however. Highly magnetic particles will respond to the field very rapidly, but have a tendency to agglomerate and collect in a magnetized region so that it is difficult to move them. This reduces the effectiveness of highly magnetic materials in this use, but the tendency to agglomerate can be overcome by coating the highly magnetic materials with nonmagnetic coatings which will keep the magnetic surfaces of the particles far enough apart so that the particles don't stick together. The best magnetically active material found to date is composed of particles of magnetite (mineral $Fe_3O_4$) coated with Paricin saturated fatty acid ester. It must be noted, however, that the composition of the coating can effect the way in which the particles react. A Paricin saturated fatty acid ester coating on magnetite has been found to be better than a carnauba wax coating on the same material, probably because the latter has more of a tendency to cause sticking than the former.

It appears, then, that magnetically active materials of intermediate magnetic properties are better than weakly magnetic materials, and better than untreated strongly magnetic materials. If a hard, frictionless, nonmagnetic coating can be formed on the strongly magnetic materials to keep them from agglomerating, however, then generally the more strongly magnetic the particles the better the particles are for use in the higher speed system.

In the work discussed above the external magnetic field had a frequency of 60c.p.s. This frequency is sufficient to create the image inversion and prime the system so that it will react rapidly to changes in the latent magnetic image. The frequency of the alternating external magnetic field is immaterial, because it is really the ability of the system to follow changes in the latent magnetic image that is important. It is possible, however, that for each magnetically active material, an optimum external magnetic field frequency can be found, so that materials which are poor at one frequency will be acceptable at other frequencies. The only limitation on the frequency of the external magnetic field is that the frequency should be well above the flicker rate which the eye can detect.

Figure 6:
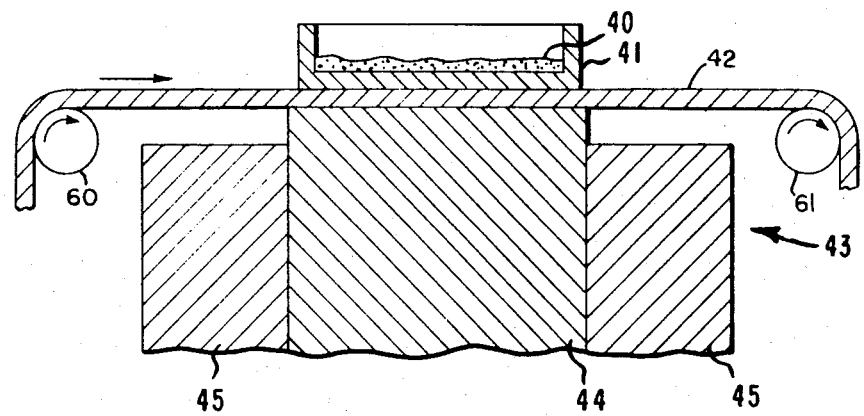
FIG. 6 is a schematic diagram of one embodiment of an apparatus that can be used in the practice of the present invention.

FIG. 6 illustrates an experimental device used to create the above effect. The magnetic material 40 is contained in a vessel 41 with a broad shallow cavity. The vessel can have a transparent cover, not shown, to contain the material. The vessel is placed on top of the magnetic member 42 supported by rolls 60 and 61 that the magnetic field from the latent magnetic image can penetrate into the vessel and effect the magnetic particles. The whole system is placed on top of an electromagnet 43 comprising a core 44, of highly permeable material, and a coil 45 surrounding the core. A source of alternating current, not shown, supplies power to the coil. The visual image of the latent magnetic image recorded on the magnetic member is produced by the powder. This image can be viewed directly by eye, or it can be displayed on a screen by reflecting light off the image onto the screen, or by any other conventional projection technique.

As shown the magnetic member and the latent magnetic image are stationary, but the latent magnetic image can be changing. One way to effect his is to incorporate a tape deck into the system with rotating support rolls, as illustrated in FIG. 6, so that magnetic member 42 is a moving magnetic tape. In this case, some framing device, such as That used in motion picture projection would be useful, and synchronization can be provided by the cyclic field at any instant when the picture is obliterate, i.e. at any multiple of a full or half cycle.

' should be obvious to one skilled in the art that if the quantity of magnetically active material placed in the cavity is too large, the shear weight of the particles coupled with the cramped location would make image resolution difficult. The amount of magnetic material placed in the cavity should, therefore, be controlled so that effective movement by the magnetic field is possible.

The above discussion has been limited to the situation where the magnetic field alternates between opposite polarity fields of equal magnitude. It should be obvious to one skilled in the art that the magnitude of the oppositely oriented fields need not be equal and that in effect the alternating polarity magnetic field can have a constant component supplied either by a separate magnet or by adding a direct current component to the alternating current supplied to the electromagnet. This constant field component can be of a magnitude sufficient merely to unequalize the amplitude of the alternating polarity component or it can be of a magnitude such that the magnetic field is no longer an alternating polarity magnetic field but is rather a magnetic field of constant polarity with an alternating component sufficient to impart the activity to the particles needed to place them in the form of a suspension.

Finally it should be obvious to one skilled in the art that the shape of the varying magnetic field is not critical. Amplitude variations other than sinusoidal variations can be used.

Figure 7:
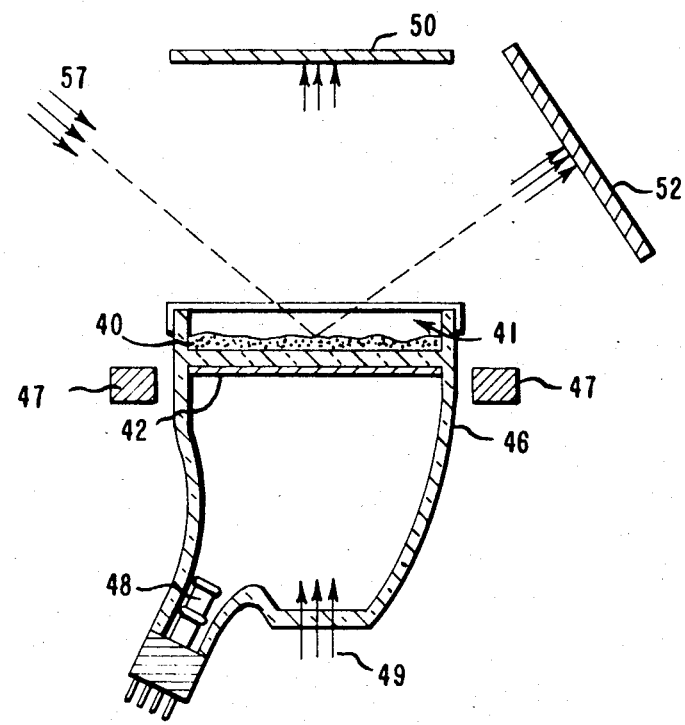
FIG. 7 is a schematic diagram of another embodiment of an apparatus that can be used in the practice of the present invention.

FIG. 7 illustrates another way in which a changing latent magnetic image can be effected. In FIG. 7 the vessel 41 containing the magnetic particles 40 is built into the envelope of a cathode ray tube 46. The magnetic member 42 is coated on the inside surface of the envelope at the bottom of the vessel. The external magnetic field is provided by external coils 47. The latent magnetic image is recorded on the magnetic member by thermoremanent writing using electron gun 48, or by some similar technique. In this context, $CrO_2$ is a very effective composition from which to make the magnetic member because of its low Curie point. The technique of thermoremanent writing is described in copending application Ser. No. 821,899, entitled Thermo-Remanent Magnetic Memory System, filed May 5,1969 by Breton et al. Other writing techniques such as Curie point writing, laser writing, magnetic style writing or magnetic head writing, can also be used.

The projection system can be a light source 49 located behind the magnetic member and designed to project the visual image on screen 50, or it can be any one of the techniques discussed above, such as that illustrated by light source 51 which is designed to reflect light off the surface of the visual image onto screen 52. The readout technique is not critical. Any means known to those skilled in the art can be used. It should be noted that the system described cannot only be used to project visual images but can also be used as a light shutter or modulator.

What is claimed is:

1. An apparatus for the visual observation of a latent magnetic image recorded on a magnetic member in the form of active magnetic interfaces which comprises:
   a. a means for supporting said magnetic member;
   b. a nonmagnetic vessel containing a broad shallow cavity, said vessel being disposed above said magnetic member in a manner such that the magnetic field due to said latent magnetic image penetrates into said cavity;
   c. a quantity of magnetically active particles disposed within said cavity; and
   d. means for producing a magnetic field of alternating polarity within said cavity to supplement the magnetic field due to said latent magnetic image, said magnetic field of alternating polarity having a maximum field strength sufficient to cause said magnetically active particles to decorate the nonmagnetized areas of said magnetic member as well as a portion of said active magnetic interfaces thereby increasing the response speed of said apparatus to changes in said latent magnetic image, said magnetic field of alternating polarity having a frequency greater than the flicker rate that the eye can detect, whereby a visual image of said latent magnetic image can be produced.

2. The apparatus of claim 1 wherein said magnetically active particles are contained in a gaseous atmosphere.

3. The apparatus of claim 1 wherein said magnetically active particles are contained in a vacuum.

4. The apparatus of claim 1 wherein said magnetically active particles are contained in a liquid.

5. The apparatus of claim 1 wherein said magnetically active particles are coated with a nonmagnetic material.

6. The apparatus of claim 1 further comprising means to produce a constant magnetic field component to said magnetic field cycled between alternating polarities 7. The apparatus of claim 1 wherein said means for producing a magnetic field of alternating polarity is an alternating current source with a direct current component.

8. The apparatus of claim 1 wherein said magnetically active particles are composed of magnetic materials selected from the group consisting of cobalt particles and mixtures of cobalt particles and magnetic $Fe_2O_3$ particles.

9. The apparatus of claim 1 wherein said magnetically active particles are coated particles of magnetite 10. The apparatus of claim 1 wherein said magnetically active particles are particles of magnetite coated with carnauba wax.

11. The apparatus of claim 1 wherein said magnetically active particles are coated particles of a ferromagnetic metal.

12 The apparatus of claim 1 wherein said means for supporting said magnetic member is adapted to move said magnetic member, whereby said visual image is a changing visual image.

13 The apparatus of claim 1 wherein said magnetic member is a stationary magnetic member and wherein said means adapted to hold said magnetic member is adapted to alter said latent magnetic image recorded on said magnetic member, whereby said visual image is a changing visual image.

14 The apparatus of claim 1 further comprising means for displaying said visual image on a screen.

15 The apparatus of claim 1 wherein said magnetic member is a magnetic member formed from the group of magnetic materials consisting of $CrO_2$ and iron oxide.

16. A method of forming a visual image of a latent magnetic image recorded on a magnetic member in the form of active magnetic interfaces which comprises:
   a. positioning a suspension of magnetically active particles in a fluid above said magnetic member in a manner such that the magnetic field due to said latent magnetic image penetrates said suspension; and
   b. providing a magnetic field of alternating polarity within said suspension to supplement the magnetic field due to said latent magnetic image, said magnetic field of alternating polarity having a maximum field strength sufficient to cause said magnetically active particles to decorate the nonmagnetized areas of said magnetic member as well as a portion of said active magnetic interfaces thereby increasing the response speed of said suspension to changes in said latent magnetic image, said magnetic field of alternating polarity having a frequency greater than the flicker rate that the eye can detect, whereby a visual image of said latent magnetic image is formed.

17 The method of claim 16 wherein the step of positioning a suspension of magnetically active particles above said magnetic member comprises positioning a powder of magnetically active particles disposed in a gaseous atmosphere above said magnetic member.

18. The method of claim 16 further comprising the step of projecting said visual image on a screen.